(12) United States Patent
Gupta et al.

(10) Patent No.: US 10,146,814 B1
(45) Date of Patent: Dec. 4, 2018

(54) RECOMMENDING PROVISIONED THROUGHPUT CAPACITY FOR GENERATING A SECONDARY INDEX FOR AN ONLINE TABLE

(71) Applicant: Amazon Technologies, Inc., Seattle, WA (US)

(72) Inventors: Aanchal Gupta, Mountain View, CA (US); Kiran Kumar Muniswamy Reddy, Sammamish, WA (US); Stuart Henry Seelye Marshall, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 390 days.

(21) Appl. No.: 14/859,075

(22) Filed: Sep. 18, 2015

(51) Int. Cl.
*G06F 17/30* (2006.01)

(52) U.S. Cl.
CPC .. *G06F 17/30321* (2013.01); *G06F 17/30339* (2013.01); *G06F 17/30584* (2013.01); *G06F 17/30595* (2013.01); *G06F 17/30864* (2013.01)

(58) Field of Classification Search
CPC ........... G06F 17/30584; G06F 12/0848; G06F 17/30286; G06F 17/30321; G06F 17/30339; G06F 9/5061; G06F 2209/503; Y10S 707/968; Y10S 707/972
See application file for complete search history.

(56) References Cited

U.S. PATENT DOCUMENTS

| | | | | |
|---|---|---|---|---|
| 7,702,628 B1* | 4/2010 | Luchangco | ....... | G06F 17/30949 707/999.006 |
| 8,311,964 B1* | 11/2012 | Efstathopoulos | ..... | G06F 3/0608 706/45 |
| 8,601,000 B1* | 12/2013 | Stefani | .............. | G06F 17/30002 707/747 |
| 9,128,965 B1* | 9/2015 | Yanacek | .......... | G06F 17/30292 |
| 9,384,227 B1* | 7/2016 | Xiao | ................ | G06F 17/30584 |

(Continued)

OTHER PUBLICATIONS

"Global Secondary Indexes—Amazon DynamoDB", Retrieved from URL: http://docs.aws.amazon.com/amazondynamodb/latest/developerguide/GSI.html on Jul. 2, 2016, pp. 1-9.

(Continued)

*Primary Examiner* — Merilyn Nguyen
(74) *Attorney, Agent, or Firm* — Robert C. Kowert; Meyertons, Hood, Kivlin, Kowert & Goetzel, P.C.

(57) ABSTRACT

A data storage system may implement recommending throughput capacity for generating a secondary index for an online table. Secondary indexes may be created for a table stored in multiple partitions in the data storage system. The data storage system may allow users to provision throughput capacity to process access requests at secondary indexes. The throughput capacity may also be used to perform updates at the secondary index as part of generating the secondary index. A creation throughput capacity may be determined that compensates for performing the updates to generate the secondary index. A user may receive a recommendation with the creation throughput capacity for creating the secondary index and may accept or modify the creation throughput capacity. The creation throughput may be automatically provisioned to create the secondary index, in some embodiments.

20 Claims, 10 Drawing Sheets

(56) References Cited

U.S. PATENT DOCUMENTS

2012/0059823 A1* 3/2012 Barber .............. G06F 17/30584
　　　　　　　　　　　　　　　　　　　　707/737
2012/0330954 A1* 12/2012 Sivasubramanian . G06F 9/5061
　　　　　　　　　　　　　　　　　　　　707/737
2014/0279855 A1 9/2014 Tan et al.

OTHER PUBLICATIONS

U.S. Appl. No. 14/859,072, filed Sep. 18, 2015, Kiran Kimar Muniswamy Reddy et al.
U.S. Appl. No. 14/859,059, filed Sep. 18, 2015, Kiran Kumar Muniswamy Reddy et al.
U.S. Appl. No. 14/859,062, filed Sep. 18, 2015, Wei Xiao et al.
U.S. Appl. No. 14/858,360, filed Sep. 18, 2015, Aanchal Gupta et al.
U.S. Appl. No. 14/859,069, filed Sep. 18, 2015, Kiran Kumar Muniswamy Reddy et al.
U.S. Appl. No. 14/859,055, filed Sep. 18, 2015, Kiran Kumar Muniswamy Reddy, et al.

* cited by examiner

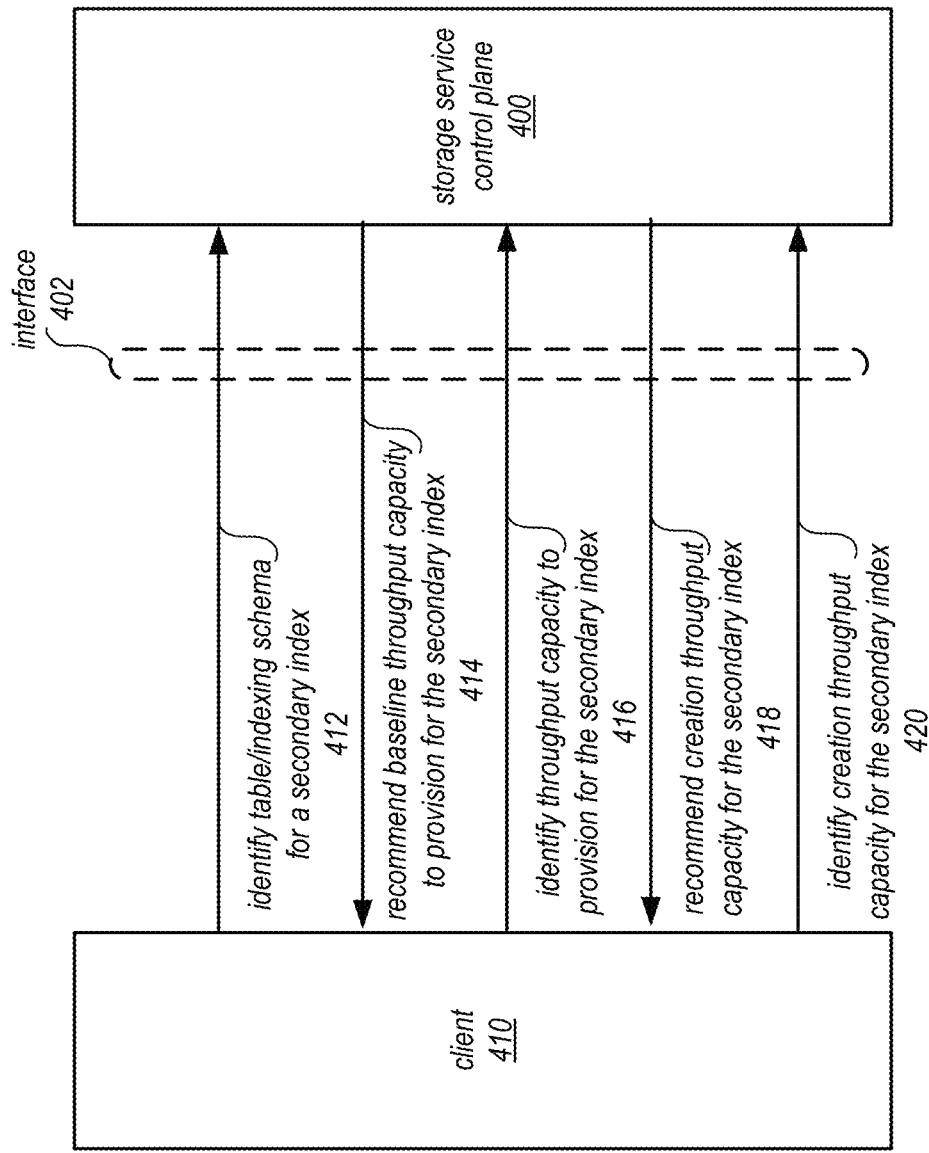

online secondary index creation interface 500 recommendation 510

For Table XYZ, 2 units is recommended for creation throughput capacity

Enter Creation Throughput Capacity  input 512

UPDATE DETAILS 514

Secondary Index Creation Details 520

Baseline Throughput Capacity:      6 units
Creation Throughput Capacity:      2 units
----------------------------------------   ---------
Total Throughput Capacity:         8 units Estimated Creation Time:           7:32:00

● Remove Creation Throughput Capacity at Completion?
530

CREATE 540

RECOMMENDING PROVISIONED THROUGHPUT CAPACITY FOR GENERATING A SECONDARY INDEX FOR AN ONLINE TABLE

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may receive a high volume of request traffic to access data and to manage the storage of data. Different mechanisms for structuring, arranging, or otherwise making data available may be implemented in order to service requests. Secondary indexes, for example, provide an alternative arrangement of data stored in a database system which may be accessed more efficiently for certain information requests. Data indexed in one fashion at a database may be indexed in a different fashion at a secondary index. Creating secondary indexes, however, can be challenging. Secondary index creation can be resource intensive and may create opportunities for inconsistency between data stored in the database table and the secondary index.

BRIEF DESCRIPTION OF THE DRAWINGS

FIG. 4 is a logical block diagram illustrating interactions between a client and a control plane for a storage service to provision throughput capacity for generating a secondary index, according to some embodiments.

FIG. 5 is an example graphical user interface that provides a creation throughput capacity recommendation, according to some embodiments.

Figure 1:
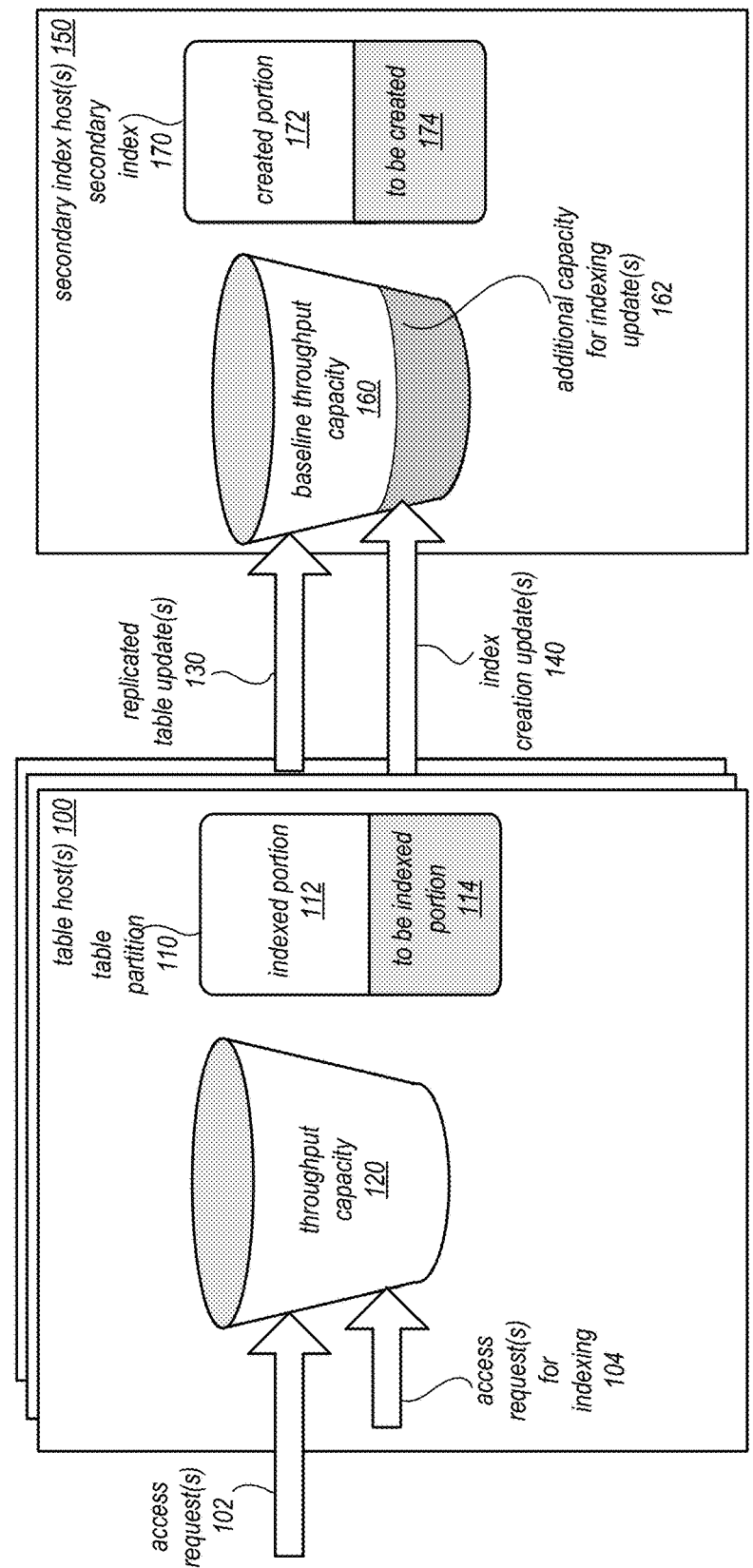
FIG. 1 is a logical block diagram illustrating generating a secondary index according to additional throughput capacity at the secondary index, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to recommend throughput capacity for generating a secondary index for an online table, according to some embodiments. Distributed data stores offer accessible and scalable storage to one or more multiple different clients. Tables of items (which may include one or more data values or attributes) may be stored, managed and accessed at a data store. Different types of distributed data stores exist. Relational distributed data stores may be implemented which organize and maintain data according to a relational scheme (e.g., a common set of data fields for an entry in a table). Non-relational distributed data stores may be implemented which organize and maintain data according to a key value pair which uniquely identifies an item in the table. Key value pairs, or other indexing schemes (which may also be implemented in relational data stores) may allow for fast throughput to update data in items or store new items. However, in some scenarios, locating items that have particular attributes may be resource intensive. For instance, if a non-relational data store is only searchable by key value pair, identifying items with a particular attribute value that is within a range of values would likely instigate a scan of an entire table even though the range of may be only a small portion of possible values for the particular attribute or the particular attribute may not exist for some items in the table.

Secondary indexes may be created for a table in a relational or non-relational data store in order to provide an alternative access schema for items in addition to a unique key value pair. For instance, a table that includes items for registered users may include a user identifier, which is unique and primary key for the item, along with a first name attribute, last name attribute, gender attribute, and age attribute. A secondary index may be generated for the table which can index items according to other values than the key value pair, such as gender and age. For example, the secondary index may be generated so that all items with male attribute values are stored together according to age attribute value order. Similarly, all items with female attribute values are stored together according to age attribute value order. In this way, an access request for data that specifies a particular range of ages for males or females may be quickly obtained without performing a scan of the entire table of items, as noted above, (which may be very costly in the case of a non-relational data store). Other attribute values may also be included in the secondary index, such as first and last name attribute values. In at least some embodiments, the key value pair that uniquely identifies the item may be included in the secondary index (e.g., the user identifier). Once created, a secondary index can be updated with any changes made to the original table.

While secondary indexes can provide useful alternative access capabilities to data, creating the secondary index may be a long running operation. However, continuing to allow access to a table for which a secondary index is being created may create throughput capacity contention, potentially starving the processing of user access requests or creation of the secondary index. In at least some embodiments, a recommended creation throughput capacity may be provided for the secondary index that may compensate for the additional processing of updates to create the secondary index while ensuring that some remaining throughput capacity may be utilized for processing user access requests.

FIG. 1 is a logical block diagram illustrating generating a secondary index according to additional throughput capacity at the secondary index, according to some embodiments. Table host(s) 100 may be storage nodes, servers, or other computing devices (e.g., system 1000 in FIG. 10) that stores part (e.g., a partition) of a table 110 for a distributed data store. Secondary index host(s) 150 may be storage nodes, servers, or other computing devices (e.g., system 1000 in FIG. 10) that stores part (e.g., a partition) or all of a secondary index 170 created for the table 110 in the non-relational data store. Table host(s) 100 and storage host(s) 150 may be multi-tenant, in some embodiments, storing data for other tables (e.g., maintained for other distributed data store clients or customers).

Table host(s) 100 may have a respective throughput capacity 120 for processing requests to a table partition 110. This throughput capacity may be shared for processing access request(s) 102 for a table partition and access requests generated to index the table partition 104 in order to create a secondary index. Throughput capacity 120 may also be shared by other operations or for handling user access requests for other table partitions hosted at storage host(s) 100 in a multi-tenant environment. In at least some embodiments, access requests 102 may have a committed or provisioned throughput capacity which guarantees a minimum throughput for processing requests 102 that may be provided at table host(s) 100. In some embodiments, throughput capacity for access requests may be limited to available capacity within a capacity limitation. For instance, the indexing update(s) 104 may consume no more than 10% of total throughput capacity 120. In at least some embodiments, throughput capacity 120 (and throughput capacities 160 and 162) may be represented in terms of input/output operations per second (IOPS) as a processing bottleneck for requests may be I/O to a storage device.

Table partition 110 may be indexed incrementally. As illustrated in FIG. 1, for example, a portion of the table 112 may be indexed, while a remaining portion 114 may still need to be indexed. In this way, indexing updates 104 can be processed when throughput capacity 120 is available. User access request(s) 102 are also processed differently if the request 104 updates a data in indexing portion 112. Generally, updates to a table are replicated to a secondary index in order to keep the secondary index consistent with the table. Thus changes to data (which would be included in the secondary index according to an indexing schema for the secondary index) may be replicated 130 to secondary index host(s) 150 to be applied to secondary index 170. For user access requests that affect remaining portions of the table 114 or requests to get data, then no replication 130 may be necessary. Index creation update(s) 140 may also be sent to secondary index host(s) 150 in order to be applied to create new entries of items in secondary index 170. Thus, secondary index 170 may have a created portion 172 and portion remaining to be created 174.

As illustrated in FIG. 1, storage host(s) 150 may have a total throughput capacity to process requests. Replication update(s) 130 and indexing update(s) 140 may be processed out of this total throughput capacity (along with other operations and requests for other partitions at host(s) 150 in a multi-tenant scenario). Baseline throughput capacity 160 may be a throughput capacity which is likely sufficient to handle requests 130 when creation of the secondary index is complete. However, due to the additional indexing update(s) 140, in various embodiments, a distributed data store may recommend that additional throughput capacity 162 be provisioned to ensure that creation of the secondary index is performed quickly, without blocking performance of user access request(s) 102 by blocking replicated table update(s) 130 for the access requests 102. The recommendation of additional throughput capacity, or creation throughput capacity, may be generated in different ways and provided to a user via an interface for a distributed data store when creation of the secondary index is being initiated. In at least some embodiments, the recommended creation throughput capacity may be determined based, at least in part, on throughput capacities of table host(s) 100 of partitions of table, which, as noted above may have limitations on the speed in which indexing update(s) 140 may be generated. Additionally, an estimated creation time may be provided based on the creation throughput capacity in order to notify a user approximately how long creation of the secondary index may take if the recommended creation throughput capacity is selected. In some embodiments, the recommended additional capacity for indexing updates 162 may be automatically provisioned in addition to baseline throughput capacity 160 when creating secondary index 170.

Please note that previous descriptions are not intended to be limiting, but are merely provided as logical examples of additional capacity for generating a secondary index at a distributed data store.

This specification begins with a general description of storage service implementing a network-based data store that may provide a recommended throughput capacity for generating a secondary index for an online table. Then various examples of the storage service are discussed, including different components/modules, or arrangements of components/module, that may be employed as part of implementing the storage service. A number of different methods and techniques to recommend throughput capacity for generating a secondary index for an online table are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
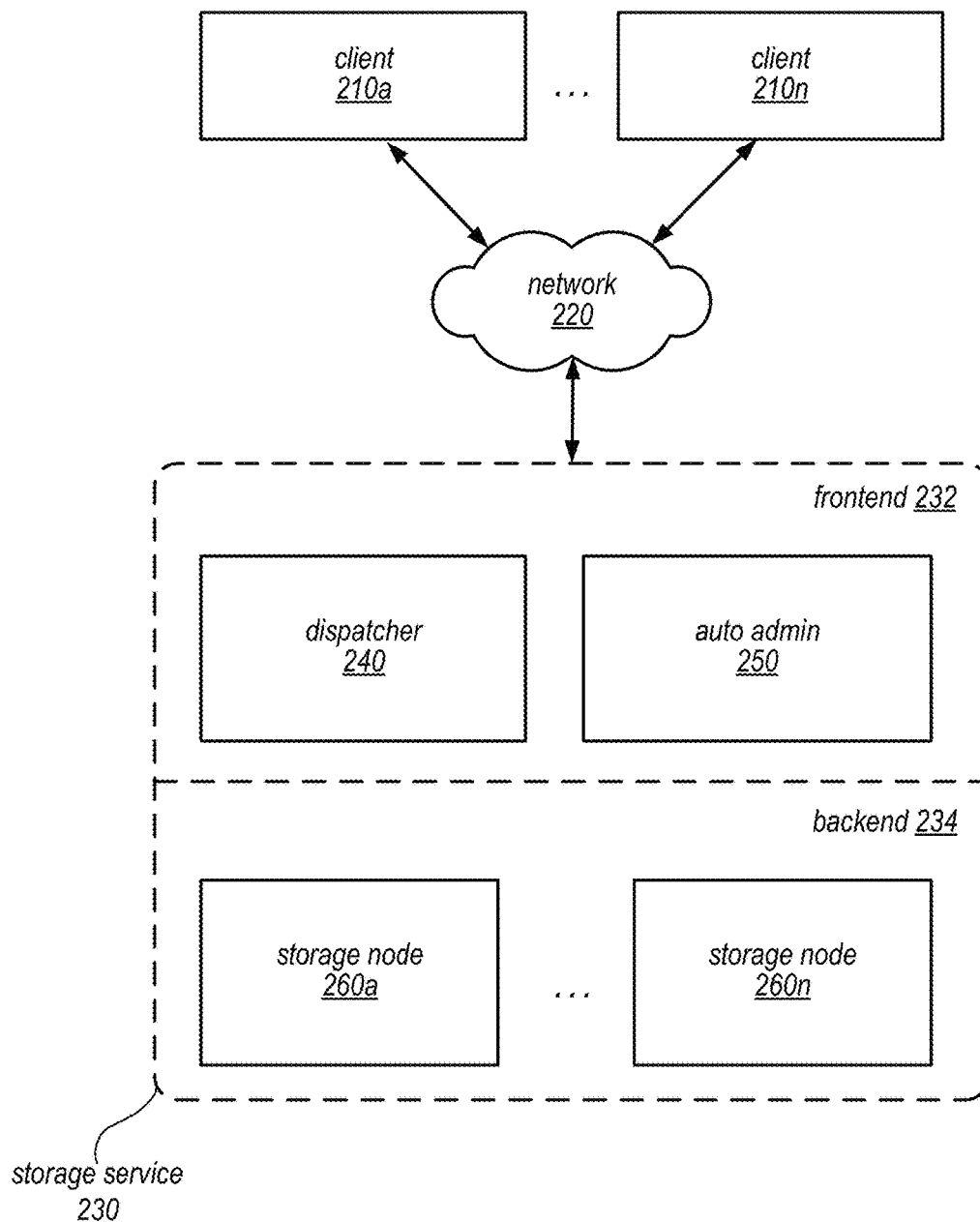
FIG. 2 is a block diagram illustrating a storage service that implements recommending throughput capacity for generating a secondary index for an online table, according to some embodiments.

FIG. 2 is a block diagram illustrating a storage service that implements recommending throughput capacity for generating a secondary index for an online table, according to some embodiments. It is noted that where one or more instances of a given component may exist, reference to that component herein below may be made in either the singular or the plural. However, usage of either form is not intended to preclude the other. In various embodiments, the components illustrated in FIGS. 2-4 may be implemented directly within computer hardware, as instructions directly or indirectly executable by computer hardware (e.g., a microprocessor or computer system), or using a combination of these techniques. For example, the components of FIG. 2 may be implemented by a distributed system including a number of computing nodes (or simply, nodes), such as computing system 1000 in FIG. 10 described below. In various embodiments, the functionality of a given storage service system component may be implemented by a particular computing node or may be distributed across several computing nodes. In some embodiments, a given computing node may implement the functionality of more than one storage service system component.

Generally speaking, clients 210a-210n may encompass any type of client configurable to submit web services requests to network-based storage service 230 via network 220. For example, a given storage service client 210 may include a suitable version of a web browser, or a plug-in module or other type of code module configured to execute as an extension to or within an execution environment provided by a web browser to provide database or data storage service clients (e.g., client applications, users, and/or subscribers) access to the services provided by network-based services platform 230. Alternatively, a storage service client 210 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 210 may be an application configured to interact directly with network-based storage service 230. In various embodiments, storage service client 210 may be configured to generate web services requests according to a Representational State Transfer (REST)-style web services architecture, a document- or message-based web services architecture, or another suitable web services architecture.

In some embodiments, storage service client 210 may be configured to provide access to network-based storage service 230 to other applications in a manner that is transparent to those applications. For example, storage service client 210 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to network-based storage service 230 may be coordinated by storage service client 210 and the operating system or file system on behalf of applications executing within the operating system environment.

Storage service clients 210 may convey web services requests to and receive responses from network-based storage service 230 via network 220. In various embodiments, network 220 may encompass any suitable combination of networking hardware and protocols necessary to establish web-based communications between clients 210 and network-based storage service 230. For example, network 220 may generally encompass the various telecommunications networks and service providers that collectively implement the Internet. Network 220 may also include private networks such as local area networks (LANs) or wide area networks (WANs) as well as public or private wireless networks. For example, both a given client 210 and network-based storage service 230 may be respectively provisioned within enterprises having their own internal networks. In such an embodiment, network 220 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based storage service 230. It is noted that in some embodiments, storage service clients 210 may communicate with network-based storage service 230 using a private network rather than the public Internet. For example, clients 210 may be provisioned within the same enterprise as the data storage service (and/or the underlying system) described herein. In such a case, clients 210 may communicate with network-based storage service 230 entirely through a private network 220 (e.g., a LAN or WAN that may use Internet-based communication protocols but which is not publicly accessible).

Generally speaking, network-based storage service 230 may be configured to implement one or more service endpoints configured to receive and process web services requests, such as requests to access tables maintained on behalf of clients/users by a database service or a data storage service, and/or the items and attributes stored in those tables. For example, network-based storage service 230 may include hardware and/or software configured to implement various service endpoints and to properly receive and process HTTP-based web services requests directed to those endpoints. In one embodiment, network-based storage service 230 may be implemented as a server system configured to receive web services requests from clients 210 and to forward them to various components that collectively implement a data storage system for processing. In other embodiments, network-based storage service 230 may be configured as a number of distinct systems (e.g., in a cluster topology) implementing load balancing and other request management features configured to dynamically manage large-scale web services request processing loads.

As illustrated in FIG. 2, network-based storage service 230 may include a dispatcher 340 (which may be configured to receive, authenticate, parse, throttle and/or dispatch service requests, among other things), one or more administrative components, or auto admin instances, 250 (which may be configured to provide a variety of visibility and/or control functions, as described in more detail herein) which may be implemented as part of frontend 232. Storage service 230 may also implement a plurality of storage node instances (shown as 260a-260n), each of which may maintain and manage one or more tables on behalf of clients/users or on behalf of the data storage service (and its underlying system) itself, as part of backend 234. Some of the functionality provided by each of these types of components is described in more detail herein, according to various embodiments. Note that in some embodiments, network-based storage service 230 may include different versions of some of the components illustrated in FIG. 2 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 2. Note also that in various embodiments, one or more database instances may be implemented on each of the storage nodes 260a-260n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, network-based storage service 230 may be configured to support different types of web services requests. For example, in some embodiments, network-based storage service 230 may be configured to implement a particular web services application programming interface (API) that supports a variety of operations on tables (or other data objects) that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments network-based storage service 230 may implement various client management features. For example, service 230 may coordinate the metering and accounting of client usage of web services, including storage resources, such as by tracking the identities of requesting clients 210, the number and/or frequency of client requests, the size of tables and/or items stored or retrieved on behalf of clients 210, overall storage bandwidth used by clients 210, class of storage requested by clients 210, and/or any other measurable client usage parameter. Network-based storage service 230 may also implement financial accounting and billing systems, or may maintain a database of usage data that may be queried and processed by external systems for reporting and billing of client usage activity. In some embodiments, network-based storage service 230 may include a lock manager and/or a bootstrap configuration (not shown).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, scan (e.g., list items) over the whole table, optionally filtering the items returned, and create one or more secondary indexes global to the whole table which may be used to perform different queries efficiently over particular attributes in the table that are used to create the secondary index.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In various embodiments, a database service or data storage service may be implemented on one or more computing nodes that are configured to perform the functionality described herein. In some embodiments, the service may be implemented by a network-based storage service (such as network-based storage service 230 in FIG. 2) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other network-based services or applications, in some embodiments).

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 3A:
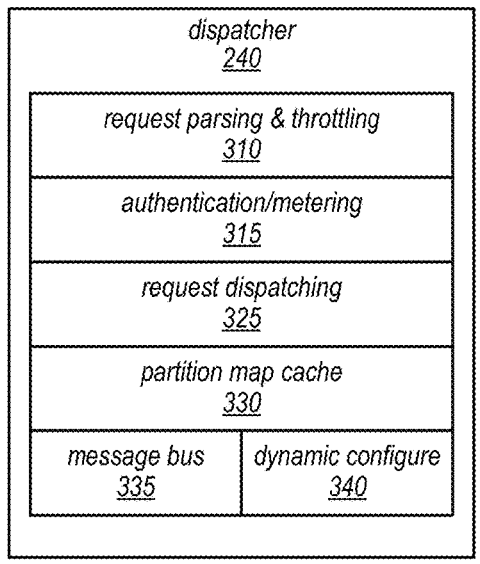
FIGS. 3A-3C are block diagrams illustrating various components of a storage service, according to some embodiments.
Figure 3B:
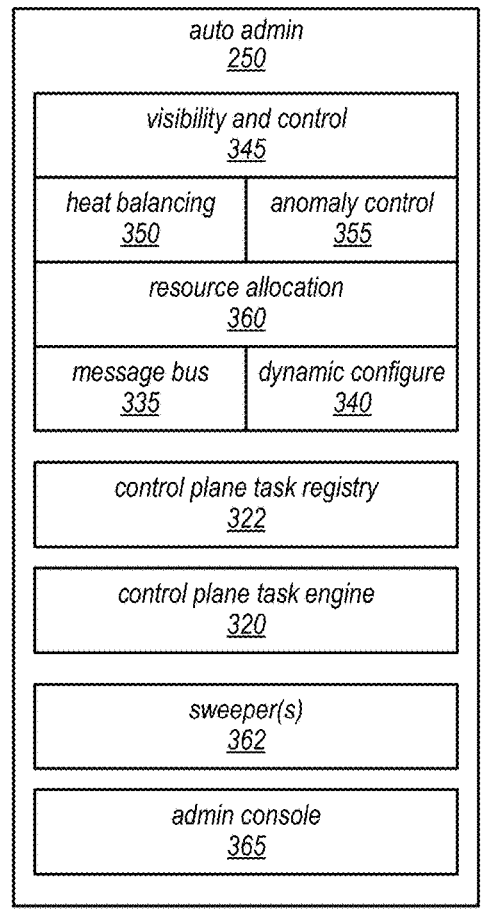
Figure 3C:
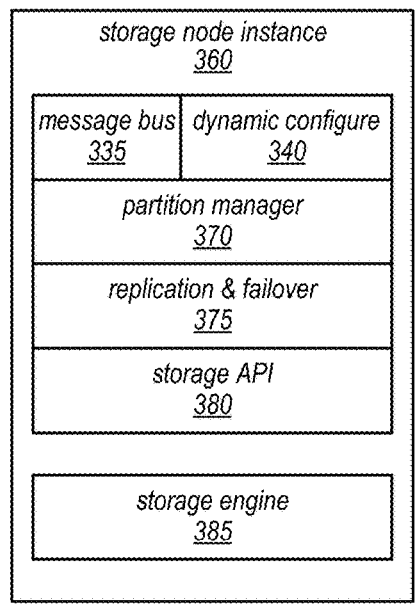

FIGS. 3A-3C illustrate various elements or modules that may be included in each of the types of components of network-based storage service 230, according to one embodiment. As illustrated in FIG. 3A, dispatcher 240 may include one or more modules configured to perform parsing and/or throttling of service requests (shown as 310), authentication and/or metering of service requests (shown as 315), dispatching service requests (shown as 325), and/or maintaining a partition map cache (shown as 330). In addition to these component-specific modules, dispatcher 240 may include components that are common to multiple types of computing nodes that collectively implement Web services platform 330, such as a message bus (shown as 335) and/or a dynamic configuration module (shown as 340). In other embodiments, more, fewer, or different elements may be included in dispatcher 240, or any of the elements illustrated as being included in dispatcher 240 may be included in another component of network-based storage service 230 or in a component configured to interact with network-based storage service 230 to provide the data storage services described herein.

As illustrated in FIG. 3B, auto admin instance 250 may include one or more modules configured to provide visibility and control to system administrators (shown as 345), or to perform heat balancing (shown as 350), and/or anomaly control (shown as 355), resource allocation (shown as 360). In some embodiments, resource allocation module 360, heat balancing module 350, anomaly control module 355, control plane event registry 322, control plane task engine 320, and/or sweeper module(s) 362, may be configured to work separately or in combination to perform identifying requests for asynchronous processing and performing asynchronous processing of requests, as described in more detail below. Auto admin instance 250 may also include an admin console 365, through which system administrators may interact with the data storage service (and/or the underlying system). In some embodiments, admin console 365 may be the primary point of visibility and control for the data storage service (e.g., for configuration or reconfiguration by system administrators). For example, admin console 365 may be implemented as a relatively thin client that provides display and control functionally to system administrators and/or other privileged users, and through which system status indicators, metadata, and/or operating parameters may be observed and/or updated.

Auto admin instance 250 may include, in some embodiments control plane task registry 322. Control plane task registry 322 may provide an interface or access to information stored about one or more detected control plane events, such as requests to be processed, at storage service 230. In at least some embodiments, control plane task registry 322 may be implemented to interface with a table or data object that can be changed, updated or written to by other modules of auto admin instance 250, such as sweeper modules 362 or control plane task engine 320. For example, in some embodiments control plane event data may be stored on a database table that is accessible via control plane task registry 322. In at least some embodiments, other service systems, nodes, devices, instances, etc. may send registration messages for detected control plane events, updates, or some other form of request to auto admin instance 250 for storage in task registry 322.

Control plane event registration messages may, in various embodiments, include information about the detected control plane event. For example, control plane event messages may include the event trigger, such as a particular client or module (e.g., sweeper module). Information about the one or more control plane operations to be performed in response to the control plane event, such as the request type or the resources to be utilized (e.g., storage nodes) may be included.

Auto admin instance 250 may also include control plane task engine 320. As noted above, in some embodiments, multiple instances of auto-admin 250 may be implemented with one instance performing the control plane task engine function, and other deputy instances implementing the sweeper(s). However, in some embodiments a single auto-admin instance may be configured to perform both task scheduling and implement the tasks handlers to perform the scheduled control plane event operations.

Control plane task engine 320 may be configured to direct the performance of different types of control plane operations among the nodes, systems, or devices implementing network-based storage service 230. For instance, task engine 320 may be configured to communicate with master nodes of clusters of storage nodes to initiate the performance of various control plane operations, such as moves, splits, update tables, delete tables, create indexes, etc. . . . Task engine 320 may also be configured to update task registry 322 (or some other table or data structure) with the status, state, or performance information of the tasks currently being performed. For example, for each child operation or subtask of a control plane operation, an update may be sent to update a respective entry in the record of the detected event to which the operation corresponds. Control plane task engine 320 may also provide updates indicating the resources that are currently utilized to perform the control plane operation, such as the particular replica, data, node, system, or device.

In various embodiments, control plane task engine 320 may be configured to perform an update table operation type. An update table operation may change or modify a performance attribute or value for the maintained table. For instance, in some embodiments, tables may have a provisioned throughput performance (e.g., a certain number of IOPS). An update table operation may change the provisioned throughput performance of the table to a different throughput performance. An update table operation may perform various sub-tasks or child operations. Upon completion or initiation of these or various other steps for performing an update table operation, task handler 150 may be configured to send/write updates to control plane event registry 120 for the detected event. An update table event may be triggered externally, for example by a client API request. In at least some embodiments, an update table API request may be identified for asynchronous processing. Alternatively, one or more internal maintenance operations, such as sweeper modules 362 may trigger an update table operation.

In various embodiments, control plane task engine may be configured to perform a secondary index creation operation in response to a client API request. For instance, in some embodiments, attributes of table may be identified for the creation of a new index for the table. Control plane task engine 320 may identify new storage node instance(s) 360 to host the index and direct storage node instance(s) 360 in the performance of scanning, building, and copying of the index to the new storage nodes instance(s) 360. In at least some embodiments, a create secondary index API request may be identified for asynchronous processing.

In addition to these component-specific modules, auto admin instance 250 may also include components that are common to the different types of computing nodes that collectively network-based storage service 230, such as a message bus (shown as 335) and/or a dynamic configuration module (shown as 340). In other embodiments, more, fewer, or different elements may be included in auto admin instance 250, or any of the elements illustrated as being included in auto admin instance 250 may be included in another component of network-based storage service 230 or in a component configured to interact with network-based storage service 230 to provide the data storage services described herein.

As illustrated in FIG. 3C, storage node instance 360 may include one or more modules configured to provide partition management (shown as 370), to implement replication and failover processes (shown as 375), and/or to provide an application programming interface (API) to underlying storage (shown as 380 Various different ones of the control plane operations described above may be performed locally (e.g., on a given storage node instance 360) based, e.g., on one or more measures of the utilization of provisioned resources on the storage devices or logical storage volumes of the storage node instance.

As noted above, different storage nodes may be implementing or maintaining resources in multiple different arrangements, some of which may be part of larger collections or groups of resources. A replica group, for example, may be composed of a number of storage nodes maintaining a replica of particular portion of data (e.g., a partition of a table) for the storage service. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

As illustrated in this example, each storage node instance 360 may include a storage engine 385, which may be configured to maintain (i.e. to store and manage) one or more tables (and associated table data) in storage 380 (which in some embodiments may be a non-relational database) on behalf of one or more clients/users. In addition to these component-specific modules, storage node instance 360 may include components that are common to the different types of computing nodes that collectively implement Network-based storage service 230, such as a message bus (shown as 335) and/or a dynamic configuration module (shown as 340). In other embodiments, more, fewer, or different elements may be included in storage node instance 360, or any of the elements illustrated as being included in storage node instance 360 may be included in another component of network-based storage service 230 or in a component configured to interact with network-based storage service 230 to provide the data storage services described herein.

Note that in some embodiments, it may not be necessary to perform some or all of the throttling, authentication, and/or metering operations that would typically be provided by dispatcher 240 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 250 (e.g., heat balancing and/or resource allocation) may or may not be applied in managing tables in a single-tenant environment. However, other operations illustrated as being performed by auto admin instance 250 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique. However, in at least some other embodiments, traditional database schemes may be employed, such as the various types of relational databases implemented using Server Query Language (SQL).

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited. These attributes may also be described by system resource metadata and anomalies between these attributes and system resource metadata may be detected.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table or to create a secondary index for a table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

FIG. 4 is a logical block diagram illustrating interactions between a client and a control plane for a storage service to provision throughput capacity for generating a secondary index, according to some embodiments. A client 410 (which may be a client 210 in FIG. 2), may access storage service 230 via an interface 402 providing programmatic and/or graphical interactions with storage service control plane 400. Storage service control plane may be implemented by various components of storage service front-end 232 in FIG. 2 (e.g., by dispatcher 240 and or auto admin instances 250) and/or additional control plane components (e.g., site hosts that serve network-based site that implements a graphical user interface).

Client 410 may initially identify a table and indexing schema for creating a secondary index 412. The request may, for instance, include a table identifier, and the attributes used to index the table (e.g., a hash and/or range key value). In some embodiments, request 412 may specify a projection of elements for the secondary index, which may indicate which attributes of an item may be included with items identified for inclusion in the secondary index (e.g., all attributes, select attributes, or primary key attribute along with the indexing attribute(s)). In some embodiments, the request may include a creation time to be used to determine a creation throughput recommendation that would result in secondary index creation within the creation time. In response, storage service control plane 400 may provide a recommended baseline throughput capacity to provision for the secondary index 414. In some embodiments, the baseline throughput capacity may be identified by the client in the previous request 412. As indicated at 416, client 410 may confirm or identify the baseline throughput capacity for the secondary index.

Storage service control plane 400 may implement the various techniques discussed below with regard to FIGS. 6-9 to provide a creation throughput capacity recommendation 418 to be provisioned in addition to the baseline throughput capacity. The recommendation may also include an estimated creation time. As indicated at 420, the client may submit a request to identify the creation throughput capacity to use for creating the secondary index. The creation throughput capacity indicated at 420 may be a modified value that is different than the recommendation, or may confirm the recommended creation throughput capacity.

FIG. 5 is an example graphical user interface that provides a creation throughput capacity recommendation, according to some embodiments. Online secondary index creation interface 500 may be an example of interface 400 in FIG. 4, which provides a graphical user interface for the storage service. In some embodiments, online secondary index creation interface 500 may be implemented as part of web-based control console for the storage service. As illustrated at element 510, the recommendation for creation throughput capacity may be provided for a secondary index for an identified table. In some embodiments, the creation throughput capacity may be converted or displayed in terms of work or service units, costs, or other representation of throughput capacity. In at least some embodiments, the creation throughput capacity may be represented in Input/Output (I/O) operations per second (IOPS).

Secondary index creation details element 520 may be implemented to provide an illustration of the secondary index creation operation in terms of units (or IOPS) including both baseline throughput capacity (which may also be a recommended amount or a user provided amount) and the currently selected creation throughput capacity (e.g., the recommended creation throughput capacity). Estimated creation time, as discussed below with regard to FIGS. 6 and 9, may also be provided based on the baseline and creation throughput capacities. Input element 512 may be implemented in order to allow a user to change (or confirm) the recommended creation throughput capacity by entering a desired creation throughput capacity. Alternatively, in some embodiments, a user interface element may allow a user to enter a creation time within which the secondary index is to be created (not illustrated). The recommendation 510 may be generated so that the estimated creation time is within the creation time specified by the user. Update details element 514 may be selected in order to re-generate secondary index creation details element to display information using the entered creation throughput capacity (e.g., updating throughput capacity totals and the estimated creation time).

In at least some embodiments, online secondary index creation interface 500 may provide users with the option to automatically remove the creation throughput capacity from the total throughput capacity upon completion of the secondary index. Element 530 may be checked or un-checked in order to enable or disable this feature. Otherwise, a user may have to manually reduce total throughput capacity when the secondary index is completed. Create element 540 may be implemented to initiate creation of the secondary index utilizing the selected creation throughput capacity, in some embodiments.

Please note that interface 500 is merely provided as an example of a graphical user interface for recommending creation throughput capacity. Various other arrangements of elements, types of elements (drop down lists, dials, buttons, switches, etc. . . . ), or additional information may be added to or used in place of the depicted user interface elements. Thus, the previous examples is not intended to be limiting.

Figure 6:
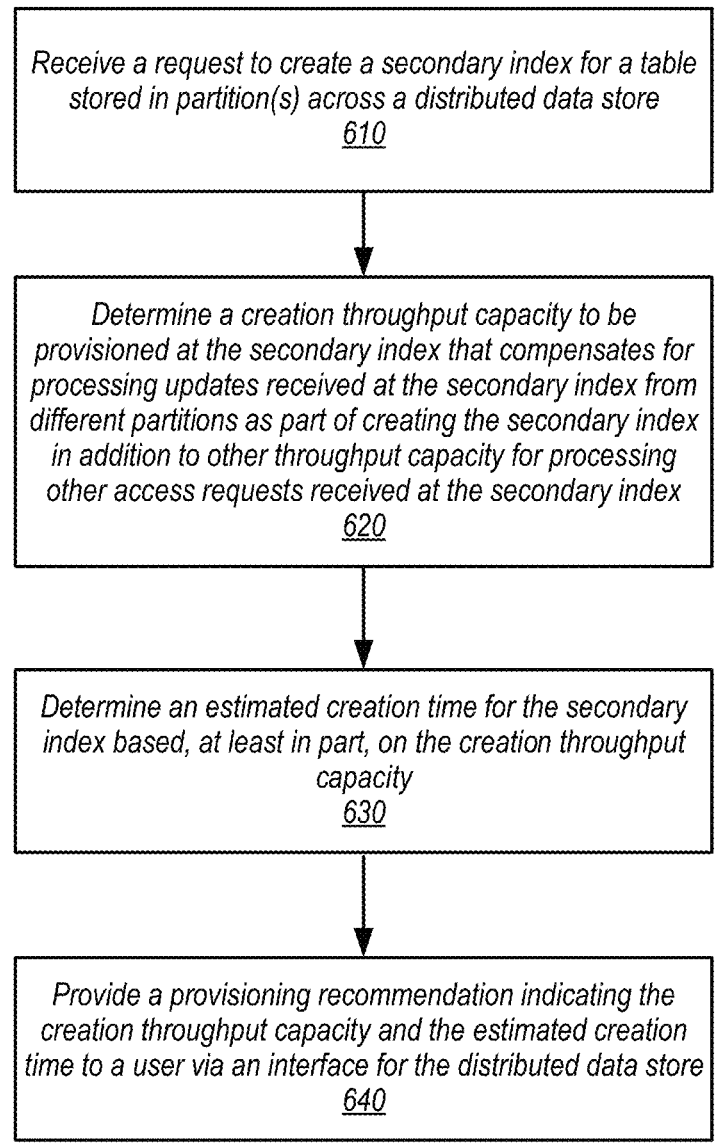
FIG. 6 is a high-level flowchart illustrating various methods and techniques to recommend throughput capacity for generating a secondary index for an online table, according to some embodiments.

The examples of recommending throughput capacity for generating a secondary index for an online table in a non-relational data store in FIGS. 2-5 have been given in regard to a data storage service (which may be a non-relational or NoSQL database service). However, various other types of distributed data stores that may provide online generation of a secondary index may implement recommend throughput capacity for generating a secondary index for an online table, such as relational data stores (which may be distributed). FIG. 6 is a high-level flowchart illustrating various methods and techniques to recommend throughput capacity for generating a secondary index for an online table, according to some embodiments. These techniques may be implemented using one or storage nodes as described above with regard to FIGS. 2-5, as well as other databases, storage systems, and/or different implementations of a client and/or storage engine, and thus the following discussion is not intended to be limiting as to the other types or configurations of non-relational data stores that may implement the described techniques.

Creation of a secondary index for a table stored in a distributed data store may be performed while the table is online, available for servicing access requests to data stored in the table. Creation of a secondary index may be initiated as a result of a request to create the secondary index, which may identify an indexing schema for items in the secondary index. For example, the request may indicate two different attributes to be utilized for indexing items in the secondary index as a hash key and a range key, or a single attribute as the hash key. Other attributes to be included in the secondary index in addition to the hash and/or range key may be specified. A request to create the secondary index for a table stored in partitions across a distributed data store may be received, as indicated at 610. The baseline throughput capacity may be provided or assumed as part of the creation request, as discussed above in FIGS. 4 and 5.

As indicated at 620, a creation throughput capacity may be determined that compensates for processing updates received as part of creating the secondary index from the different partitions of the table in addition to other throughput capacity for processing other access requests received as part of the secondary index, in various embodiments. For instance, estimates may be determined based on the table size and/or type of secondary index being created. Table size may utilized in various formulas which determine a time to index an entire table (e.g., by dividing the number of work units, such as IOPS, for indexing all of the items in the table by a given amount of time). Then, a portion of items which are likely to be included in the index may be estimated.

For example, sampling of the items in the table may be performed to determine a common distribution of items to be included in the index according to an indexing schema for the index, from which the portion of items may be extrapolated. Alternatively, a user may provide an estimated number of items that are likely to be included, in some embodiments. The portion of items as fraction of total items in the table may be applied to the time to index the entire table to create a throughput capacity to index the items likely to be included in the secondary index.

Figure 7:
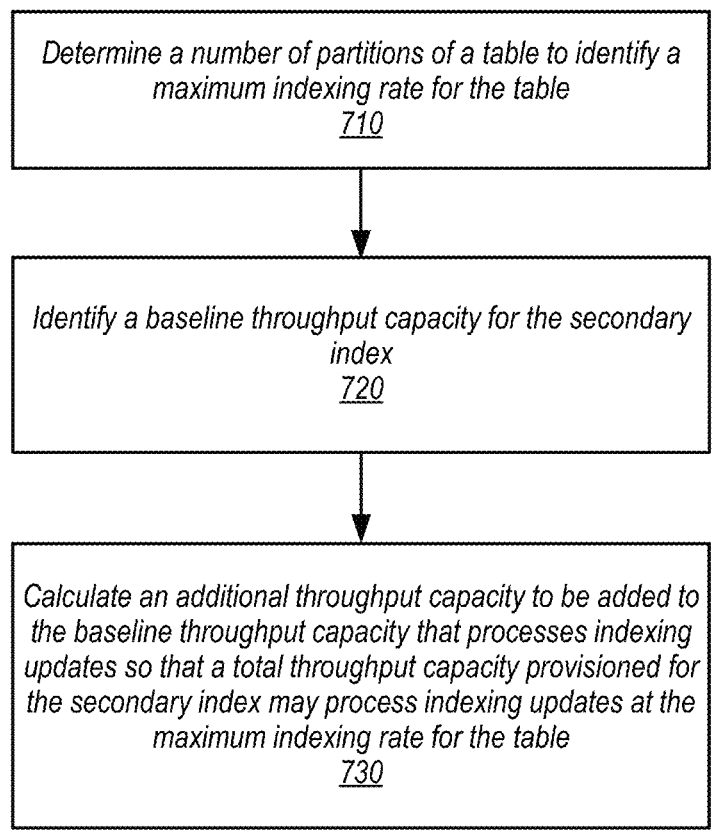
FIG. 7 is a high-level flowchart illustrating various methods and techniques to determine a creation throughput capacity to recommend for a secondary index, according to some embodiments.

In at least some embodiments, simple recommendation rule may be provided which is derived from historical analysis of the creation of other secondary indexes for the table or other tables using a similar indexing schema. For instance, the simple recommendation rule may be 20% of the baseline table throughput capacity. Some recommendation techniques may account for the distributed nature of partitions to work in parallel to index the table. FIG. 7, discussed in detail below provides various ways in which such techniques may be implemented to determine the creation throughput capacity. In at least some embodiments, the request may include a creation time. The determined throughput capacity may be calculated such that the recommended creation throughput capacity may result in creation of the secondary index within the creation time (e.g., as may be determined by comparing the estimated creation time for the secondary index). In some embodiments, creation throughput capacity may be limited according to a cost threshold which may limit the creation throughput capacity so that a cost of the total throughput capacity for the secondary index including the creation throughput capacity is considered when making a provisioning recommendation.

Figure 9:
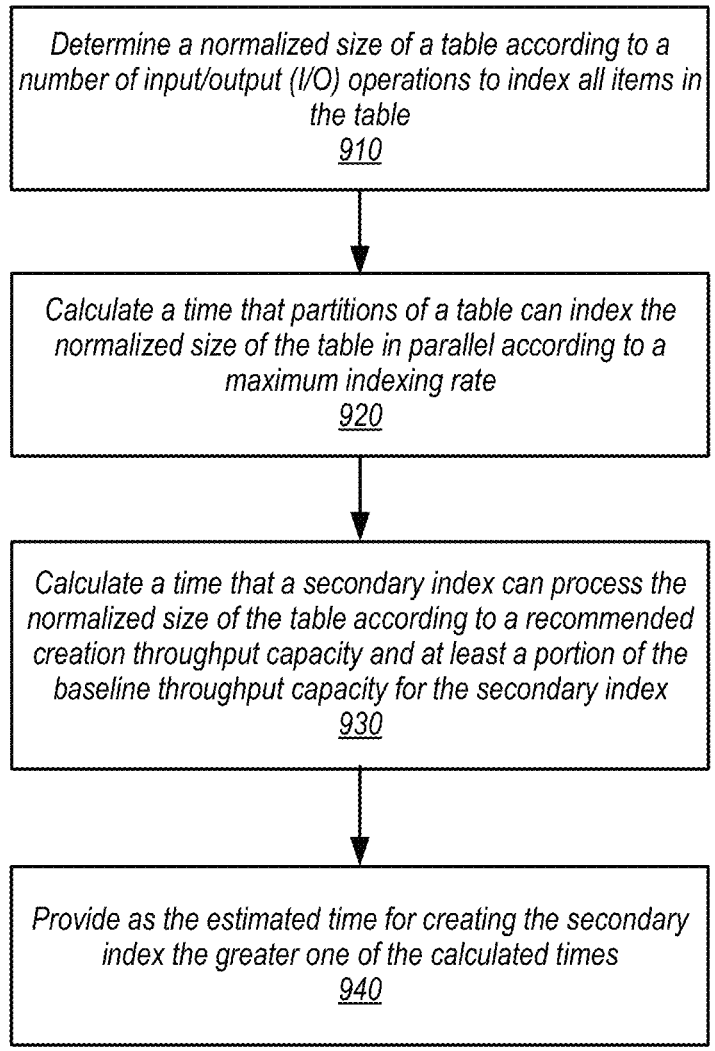
FIG. 9 is a high-level flowchart illustrating various methods and techniques for determining an estimated creation time for a secondary index, according to some embodiments.

As indicated at 630, an estimated creation time may also be determined for the secondary index based, at least in part, on the creation throughput capacity. Estimated creation time may be determined according to two variables, the speed at which partitions may index the table, and the speed at which the secondary index may process updates received from the table. Different ways for determining these variables may be implemented. For example, the amount of throughput capacity utilized for user access requests (e.g., reads, gets, writes, or puts) to the table may be determined along with other operations that utilize throughput capacity at storage nodes or hosts for the partitions. The remaining capacity out of the throughput capacity may be extra system throughput capacity utilized to perform indexing to generate the secondary index. Therefore, the estimated system capacity available (e.g., which may be an average of available system capacity as utilization throughput capacity may change over time) may be used to determine the rate at which indexing of the partitions may be performed. Similarly, the rate at which other requests that are not indexing updates (e.g., updates to previously created portions of the secondary index) may be estimated to determine what of the total throughput capacity for the secondary index, including the creation throughput capacity, may be utilized to process indexing updates. FIG. 9 provides discussion of various techniques to estimate time for creating an index below.

As indicated at 640, the provisioning recommendation indicating the creational throughput capacity may be provided via an interface for the distributed data store, in various embodiments. The interface may be a graphical user interface, as illustrated above in FIG. 5, a may be a text-based interface, such as a command-line interface which receives text commands formatted according to an API for the distributed data store, or a network-based interface (e.g., a website interface which may be implemented using a graphical user interface and underlying API). The recommendation may also include the determined estimated creation time, in some embodiments. A modification to the creation capacity may be made via the interface which initiates creation of the secondary index utilizing the modified creation throughput capacity. Alternatively, a request may be received via the interface to utilize the recommended creation throughput capacity.

In at least some embodiments, the creation throughput capacity may be provisioned for the secondary index along with the baseline throughput capacity for the secondary index as a total throughput capacity for the secondary index. Provisioning may be performed automatically as part of creating the secondary index. In some embodiments, the provisioning may be performed in response to a request to provision the recommended creation capacity in addition to the baseline capacity may be received. In some embodiments, the throughput capacity of the table may be changed to remove the creation capacity upon completion of the secondary index.

Provisioning and removing throughput capacity may be performed by allocating, deallocating, or otherwise changing the storage resources (e.g., storage hosts or numbers of partitions of a secondary index) that host the secondary index in order to guarantee the throughput capacity. For instance, a number of storage hosts with storage devices with available IOPS may be provisioned sufficient to meet a provisioned throughput capacity in IOPS.

FIG. 7 is a high-level flowchart illustrating various methods and techniques to determine a creation throughput capacity to recommend for a secondary index, according to some embodiments. The rate at which the secondary index is generated may be dependent, in part, on the rate at which the table can be index and updates generated which identify items in the table to be included in the secondary index. In the case of partition tables, indexing may proceed in parallel fashion (although some partitions may perform indexing slower or faster than other partitions depending on other ongoing operations). In order to determine how quickly a table can be indexed, the number of partitions may be determined, as indicated at 710. In some embodiments, the number of partitions may be stored in system metadata or another location which can be easily accessed to determine the number of partitions (e.g., the number can be incremented or decremented as table partitions are created or removed). In some embodiments, the number of partitions may be estimated based on known information about the table. For example, in some embodiments, the number of partitions may be determined based on provisioned throughput capacity (e.g., read or write capacity) or based on the size of the table (e.g., as partitions may have size limits). For example, if a table is 50 Gigabytes and the maximum size of a partition is 10 Gigabytes, then the table may have at least 5 partitions.

As indicated at 720, a baseline throughput capacity may be identified for the secondary index. The baseline throughput capacity may, in some embodiments, be the same as the baseline throughput capacity for the table (e.g., 100 IOPS table of writes, 100 IOPS at a secondary index for writes). In some embodiments, a user may specify a different amount of throughput capacity for the baseline of a secondary index (e.g., 80 IOPS).

As indicated at 730, an additional throughput capacity may be calculated that when added to the baseline throughput capacity equals a total throughput capacity provisioned for the secondary index that may process indexing updates at the maximum indexing rate for the table, in various embodiments. A maximum indexing rate may be the fastest rate at which each partition of the table can index the respective partition of the table, which in turn provides the fastest possible rate at which the table, in various embodiments. A maximum indexing rate could be the rate provided when all of the throughput capacity for a partition (or storage node or host of the partition) is devoted to indexing the partition. Alternatively, the maximum indexing rate may be determined by capacity or rate limitations enforced for indexing partitions (e.g., at storage nodes or hosts of the partitions). For example, each storage host may limit the indexing operations at the storage host to 10% of the total throughput capacity, ensuring that other operations are still processed. Consider that storage hosts or nodes may have total throughput capacity of 5,000 IOPS. Therefore, the maximum rate at which indexing of a partition may be performed is 500 IOPS (=10% of 5,000). A maximum indexing rate may be identified according to the number of partitions for the table. If there are 6 partitions of the table, then the maximum indexing rate for the table may 3,000 IOPS (=6*500).

The additional capacity may be calculated by subtracting the baseline throughput capacity from the maximum indexing rate. If, for instance the baseline throughput capacity is 2,400 IOPS and the maximum indexing rate is 3,000 IOPS (as in the example given above, then the additional capacity to be provided as the creation throughput capacity recommendation may be 600 IOPS (=3,000−2,400).

Figure 8:
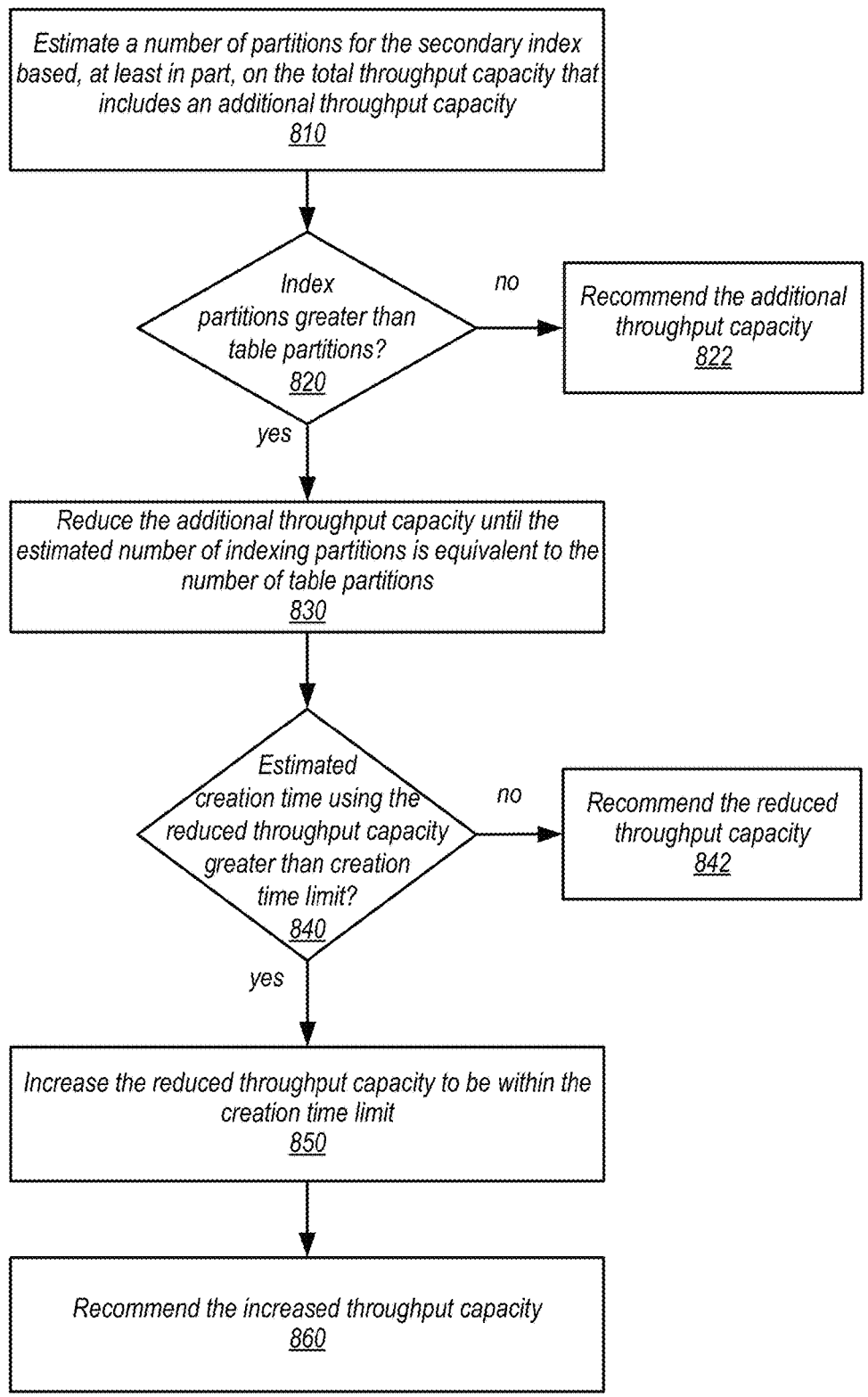
FIG. 8 is a high-level flowchart illustrating various methods and techniques modifying a creation throughput capacity, according to some embodiments.

The recommended creation throughput capacity may be modified in some scenarios. For instance, the creation throughput capacity may be too large to implement, may take too long. FIG. 8 is a high-level flowchart illustrating various methods and techniques modifying a creation throughput capacity, according to some embodiments. As indicated at 810, a number of partitions implementing the secondary index may be estimated based, at least in part on the total throughput capacity of the secondary index including the additional throughput capacity for creating the secondary index. The baseline throughput capacity may also be included in the total capacity. For example, if the total capacity is 2400 IOPS and the maximum number of IOPS a single partition of the secondary index can provide is 600 IOPS, then the number of indexing partitions may be estimated as 4 partitions.

As indicated at 820, if the number of indexing partitions exceeds a number partitions for the table (e.g., as discussed above at FIG. 7), then the additional capacity may be reduced until the total capacity results in an estimated number of partitions that does not exceed the number of partitions, as indicated at 830. For instance, if the table only has 3 partitions, in the example given above, then the additional capacity may be reduced to 1800 IOPS to equal 3 partitions for the secondary index. Otherwise, as indicated by the negative exit from 820, the additional capacity may be provided in the recommendation, as indicated at 822.

In some instances, the desirability of have matching numbers of indexing partitions and table partitions may be outweighed by the time impact which reducing the total capacity has. For instance, as indicated at 840, a time limit for generating the secondary index may be imposed (e.g., 24 hours). If, an estimated time for creating the secondary index (as determined according to one of the techniques discussed below with regard to FIG. 9) is greater than a creation time limit for the secondary index (e.g., supplied by a request user or a system default), then as indicated by the positive exit from 840, the additional capacity may be increased to meet the time threshold, as indicated at 850. For example, the number of indexing partitions may be doubled (e.g., increasing the 3 partitions to 6, and thus increasing additional capacity to have a total capacity of 3600 IOPS). The increased throughput capacity may be provided in the recommendation, as indicated at 860. Otherwise, the reduced additional capacity may be provided in the recommendation, as indicated at 842.

FIG. 9 is a high-level flowchart illustrating various methods and techniques for determining an estimated creation time for a secondary index, according to some embodiments. As indicated at 910, a normalized size of the table may be determined according to a number of input/output (I/O) operations to index all items in the table. The actual size of a table may not accurately depict how many I/O operations to index a table as a table may be indexed on a per item basis. For instance, an I/O operation may be used to read an item (or portion of an item) whether the size of the item utilizes the full capability of the I/O operation or not (e.g., an item may be less than 1 KB, which is the largest amount of data an I/O operation can read/write). The normalized size of a table may account for the actual number of I/O operations that may be performed, instead of the number of I/O operations performed if each I/O operation was fully utilized. In some embodiments, normalized size=the ceiling of (actual table size in bytes)/(total number of items*bytes in an I/O operation))*bytes in an I/O operation. In the 1 KB example given above, normalized size=the ceiling of (actual table size in bytes)/(total number of items*1024))*1024.

As indicated at 920, a time that partitions of the table can index the normalized size of the table in parallel according to a maximum indexing rate may be calculated. As discussed above with regard to FIG. 7, the maximum indexing rate may be a limitation on the rate at which individual partitions of a table may index the partition of the table. Thus, in some embodiments, the time=normalized size/(maximum rate*number of table partitions). For instance, if the maximum rate is 500 IOPS at each partition, then for every second each partition may perform up to 500 I/O operations for indexing the partition. If there are 5 partitions storing a table of normalized size 200,000, then time=200,000/(5*500)=80 seconds.

While the time estimated at 920 provides a time in which partitions of table may index the table in order to generate the secondary index, secondary index also has to process the updates sent from the partitions. Therefore an estimated time for creation may also reflect the time to process the updates at the secondary index. As indicated at 930, a time that a secondary index can process the update requests for the normalized size of the table according to a creation throughput capacity, in some embodiments. Thus, in some embodiments, time=normalized size/creation throughput capacity. For example, if creation throughput capacity is 200 IOPS and the normalized size of the table is 200000 KB, then the time may be 200000/200=1000 seconds.

As indicated at 940, the greater of the two calculated times may be selected as the estimated time, in various embodiments. Consider the above examples. The estimated time may be 1,000 seconds (≈16 min 40 seconds), as 1,000 is >than 80. Note that the discrepancy in times is an example of the impact that creation throughput capacity provisioned at the secondary may have upon creating the secondary index.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 10:
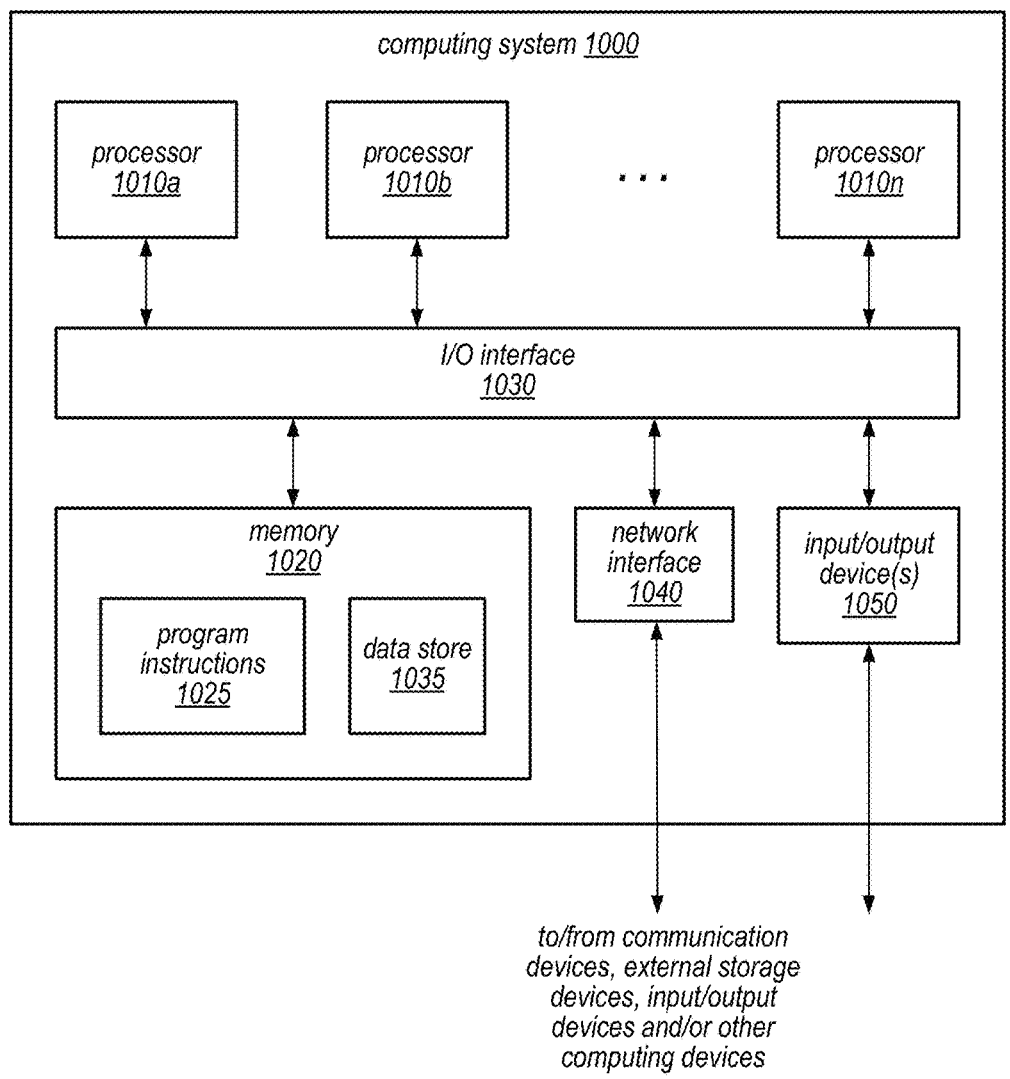
FIG. 10 is a block diagram illustrating an example computing system, according to some embodiments.

Embodiments of recommending throughput capacity for generating a secondary index for an online table as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 1020 may be configured to store program instructions 1025 and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement the various embodiments of the systems as described herein, and data store 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A distributed data store, comprising:
   a plurality of storage nodes that store different partitions of a table;
   an interface for the distributed data store;
   one or more hardware processors and associated memory to implement a control plane for the distributed data store, configured to:
   receive a request, via the interface, to create a secondary index for the table at one or more other storage nodes in the distributed data store;
   generate a recommendation for provisioning throughput capacity at the other storage nodes of the secondary index, wherein the recommendation identifies a creation throughput capacity that compensates for processing updates received at the other storage nodes as part of creating the secondary index in addition to baseline throughput capacity for processing other access requests received at the other storage nodes, wherein the updates received at the other storage nodes as part of creating the secondary index are received from different ones of the storage nodes storing the partitions of the table;
provision a total throughput capacity for the secondary index that includes the recommended creation throughput capacity and the baseline throughput capacity; and
initiate creation of the secondary index using the provisioned creation throughput capacity.

2. The distributed data store of claim 1, wherein to generate the recommendation, the control plane is configured to:
identify a maximum indexing rate for the table according to a number of partitions of the table; and
calculate additional throughput capacity to be added to the baseline throughput capacity such that a total throughput capacity for processing the updates received as part of creating the index at the maximum indexing rate, wherein the additional throughput capacity is identified as the creation throughput capacity.

3. The distributed data store of claim 1, wherein the control plane is further configured to determine an estimated creation time for the secondary index based, at least in part, on the creation throughput capacity, and wherein the estimated creation time is included in the recommendation sent to the user.

4. The distributed data store of claim 1, wherein the distributed data store is a non-relational storage service, wherein the table is maintained for a customer account of the non-relational storage service, and wherein the interface for the distributed data store is a graphical user interface.

5. A method, comprising:
performing, by one or more computing devices:
for a secondary index for a table stored across a plurality of partitions in a distributed data store:
determining a creation throughput capacity to be provisioned for the secondary index that compensates for processing updates received at the secondary index as part of creating the secondary index in addition to other throughput capacity for processing other access requests received at the secondary index, wherein the updates received at the secondary index as part of creating the secondary index are received from different ones of the plurality of partitions of the table;
providing a provisioning recommendation indicating the creation throughput capacity via an interface for the distributed data store; and
initiating creation of the secondary index using throughput capacity provisioned based on the provisioning recommendation.

6. The method of claim 5, wherein determining the creation throughput capacity to be provisioned for the secondary index comprises:
determining a number of partitions of the table to identify a maximum indexing rate for the table; and
calculating additional throughput capacity to be added to the other throughput capacity such that a total throughput capacity at the secondary index is sufficient to process the updates received as part of creating the index at the maximum indexing rate, wherein the additional throughput capacity is identified as the creation throughput capacity.

7. The method of claim 6, wherein determining the creation throughput capacity to be provisioned for the secondary index further comprises reducing the additional throughput capacity based, at least in part, on an estimated number of partitions of the secondary index sufficient to provide the total throughput capacity, wherein the reduced throughput capacity is identified as the creation throughput capacity.

8. The method of claim 5, further comprising:
receiving a request to create the secondary index, wherein the request comprises a creation time for the secondary index; and
wherein determining the creation throughput capacity comprises calculating additional throughput capacity to be provisioned to create the secondary index within the creation time.

9. The method of claim 8, wherein determining the estimated creation time comprises:
determining a normalized size of the table according to a number of input/output (I/O) operations to access items in the table at a point in time;
calculating a time that partitions of the table the partitions of the table can index the normalized size of the table in parallel according to a maximum indexing rate;
calculating a time that the secondary index can process the normalized sized of the table according to the creation throughput capacity; and
selecting as the estimated time the greater of the calculated times.

10. The method of claim 5, wherein the secondary index is stored across a plurality of other partitions in the distributed data store.

11. The method of claim 5, further comprising:
determining another creation throughput capacity that compensates for processing access requests at the partitions of the table; and
wherein the other creation throughput capacity is included in the recommendation provided to the user.

12. The method of claim 5, wherein the creation throughput capacity is identified as a number of I/O operations per second (IOPS) for write operations.

13. The method of claim 5, wherein the distributed data store is a network-based storage service, wherein the table is maintained for a customer account of the non-relational storage service, and wherein the interface for the distributed data store is a network-based interface.

14. A non-transitory, computer-readable storage medium, storing program instructions that when executed by one or more computing devices cause the one or more computing devices to implement:
receiving a request to create a secondary index for a table stored across a plurality of partitions in a distributed data store;
generating a recommendation for provisioning throughput capacity at the secondary index, wherein the recommendation identifies a creation throughput capacity that compensates for processing updates received at the secondary index in addition to baseline throughput capacity for processing other access requests received at the secondary index, wherein the updates received at the secondary index as part of creating the secondary index are received from different ones of the partitions of the table;
provisioning a total throughput capacity that includes the creation throughput capacity identified in the recommendation and the baseline throughput capacity for the secondary index; and
initiating creation of the secondary index using the creation total throughput capacity.

15. The non-transitory, computer-readable storage medium of claim 14, wherein, in generating the recommendation, the programming instructions cause the one or more computing devices to implement:
   determining a number of partitions of the table to identify a maximum indexing rate for the table; and
   calculating additional throughput capacity to be added to the baseline throughput capacity such that a total throughput capacity at the secondary index is sufficient to process the updates received as part of creating the index at the maximum indexing rate, wherein the additional throughput capacity is identified as the creation throughput capacity.

16. The non-transitory, computer-readable storage medium of claim 14, wherein, in generating the recommendation, the programming instructions cause the one or more computing devices to implement:
   modifying a candidate creation throughput capacity in response to determining that an estimated creation time for the secondary index determined according to the candidate creation throughput capacity exceeds a creation time limit.

17. The non-transitory, computer-readable storage medium of claim 14, wherein the program instructions cause the one or more computing devices to further implement:
   determining an estimated creation time for the secondary index based, at least in part, on the creation throughput capacity; and
   wherein the estimated creation time is included in the recommendation provided to the user.

18. The non-transitory, computer-readable storage medium of claim 14, wherein the program instructions cause the one or more computing devices to implement:
   wherein provisioning the total throughput capacity that includes the creation throughput capacity and the baseline throughput capacity for the secondary index is performed in response to a user request that includes the creation throughput capacity in a request to provision the total throughput capacity for the secondary index.

19. The non-transitory, computer-readable storage medium of claim 14, wherein the program instructions cause the one or more computing devices to implement:
   upon creation of the secondary index, reducing the total throughput capacity to remove the creation throughput capacity.

20. The non-transitory, computer-readable storage medium of claim 14, wherein the distributed data store is a network-based storage service, wherein the table is maintained for a customer account of the non-relational storage service, and wherein the interface for the distributed data store is a graphical user interface.

* * * * *